United States Patent
Kisiel

(10) Patent No.: US 6,758,524 B2
(45) Date of Patent: Jul. 6, 2004

(54) COMPACT RECLINER ASSEMBLY FOR A VEHICLE SEAT

(75) Inventor: Peter Kisiel, Aurora (CA)

(73) Assignee: Magna Seating Systems Inc., Aurora (CA)

( * ) Notice: Subject to any disclaimer, the term of this patent is extended or adjusted under 35 U.S.C. 154(b) by 10 days.

(21) Appl. No.: 10/332,715

(22) PCT Filed: Jul. 13, 2001

(86) PCT No.: PCT/CA01/01019

§ 371 (c)(1),
(2), (4) Date: Jan. 13, 2003

(87) PCT Pub. No.: WO02/06079

PCT Pub. Date: Jan. 24, 2002

(65) Prior Publication Data

US 2003/0137175 A1 Jul. 24, 2003

(51) Int. Cl.[7] .................................................. B60N 2/02
(52) U.S. Cl. .................. 297/362; 297/378.12; 297/365; 297/373
(58) Field of Search ......................... 297/378.12, 378.1, 297/362, 365, 373

(56) References Cited

U.S. PATENT DOCUMENTS

| | | |
|---|---|---|
| 4,070,058 A | 1/1978 | Muehling |
| 4,708,392 A | 11/1987 | Werner et al. |
| 4,832,405 A | 5/1989 | Werner et al. |
| 4,916,962 A | 4/1990 | Tsutsumi et al. |
| 4,930,841 A | 6/1990 | Wittig |
| 4,943,116 A | 7/1990 | Ohwada et al. |
| 5,016,940 A | 5/1991 | Holloway |
| 5,052,989 A | 10/1991 | Reubeuze |
| 5,096,261 A | 3/1992 | Baloche |
| 5,312,158 A | 5/1994 | Wittig et al. |
| 5,438,732 A | 8/1995 | Engels et al. |
| 5,516,198 A * | 5/1996 | Yokoyama .................. 297/362 |
| 5,524,970 A | 6/1996 | Kienke et al. |
| 5,718,480 A | 2/1998 | Schuler et al. |
| 5,755,491 A | 5/1998 | Baloche et al. |
| 5,871,414 A | 2/1999 | Voss et al. |

* cited by examiner

Primary Examiner—Laurie K. Cranmer
(74) Attorney, Agent, or Firm—Clark Hill PLC

(57) ABSTRACT

A recliner assembly for selectively locking a seat back in one of a plurality of reclined positions relative to a seat cushion on a vehicle seat. The recliner includes a cylindrical shaft extending axially and longitudinally between first and second ends and having a plurality of teeth extending radially outwardly therefrom between the first and second ends. The recliner also includes a seat back disc rotatably coupled to the shaft between the teeth and the first end and fixedly secured to the seat back and having a rack of teeth extending axially therefrom. The recliner includes a seat cushion disc fixedly secured to the shaft between the seat back disc and the first end and also fixedly secured to the seat cushion. A locking disc having a center bore defined by a plurality of locking teeth is axially coupled to the shaft by mating engagement of the locking teeth with the teeth on the shaft. A cam ring is slidably coupled to the shaft and fixedly secured to the locking disc. The cam ring has a plurality of ramped cam surfaces extending axially toward the second end of the shaft. A cam disc is rotatably coupled to the shaft between the cam ring and the second end and has a plurality of cam blocks extending axially toward the cam ring for engagement therewith. Upon rotation of the cam disc about the shaft, the cam blocks engage with the cam surfaces and force the cam ring and the locking disc to move axially along the shaft to lockingly engage the locking teeth with the teeth on the seat back disc for selectively locking said seat back in one of the reclined positions.

12 Claims, 3 Drawing Sheets

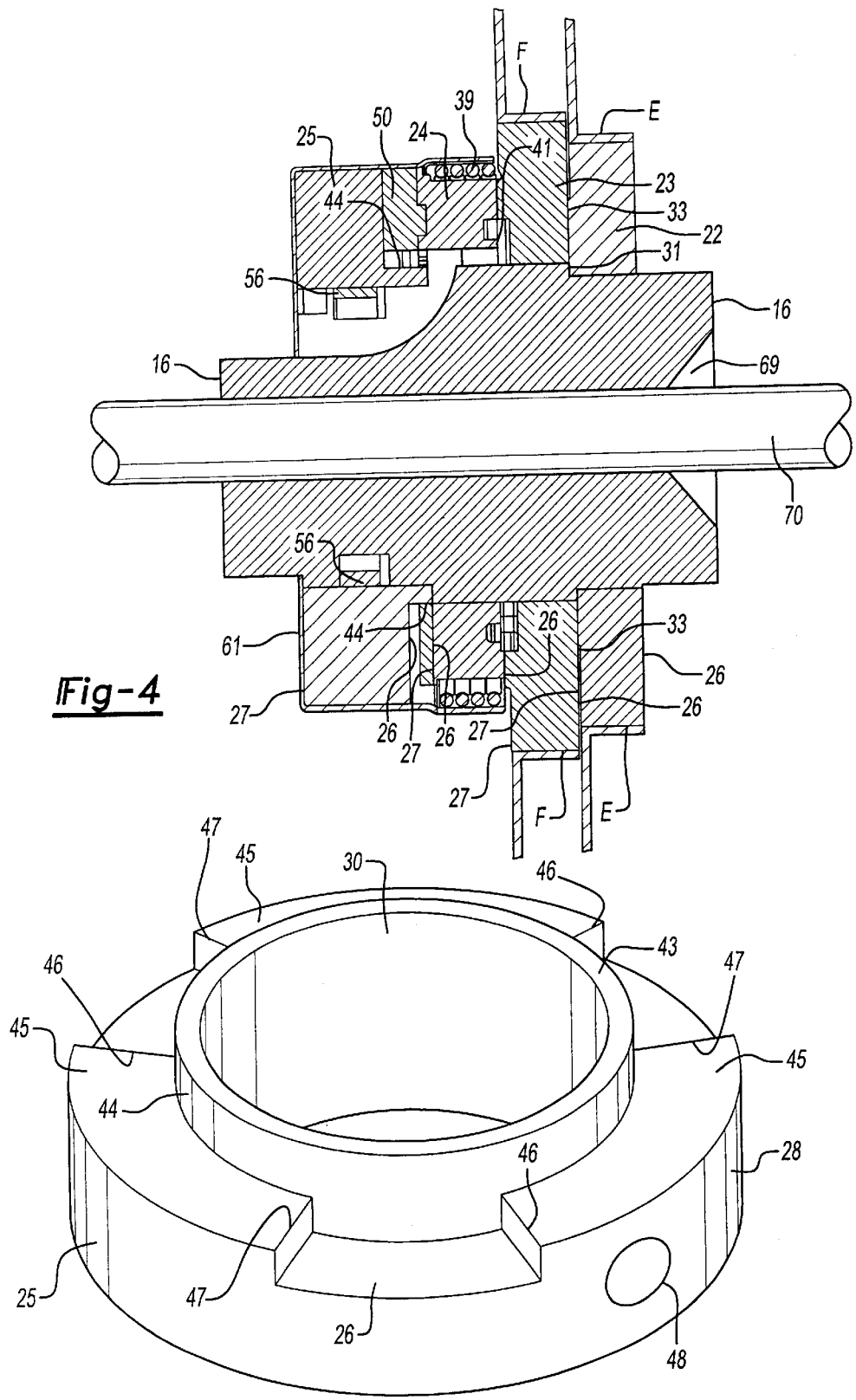

COMPACT RECLINER ASSEMBLY FOR A VEHICLE SEAT

BACKGROUND OF THE INVENTION

1. Field of the Invention

The subject invention relates to a recliner assembly for adjustment of a seat back relative to a seat cushion of an automotive vehicle seat.

2. Description of the Prior Art

Automotive vehicles include vehicle seat assemblies for supporting a seated occupant in the vehicle. The seat assemblies typically comprise a generally horizontal seat cushion and a seat back pivotally connected to the seat cushion by a recliner mechanism allowing adjustment of the seat back relative to the seat cushion between a plurality of recline positions. Each of the seat cushion and the seat back commonly comprise a rigid frame structure supporting a cellular foam pad that is encased by a fabric trim cover.

Disc recliners are well known in the vehicle seating art and commonly used to pivotally connect a seat back to a seat cushion. Disc recliners commonly include a cylindrical inner disc fixedly secured to the seat cushion and a cylindrical outer disc fixedly secured to the seat back and rotatably coupled to the inner disc. Disc recliners further include a locking mechanism for maintaining the angular position of the seat back relative to the seat cushion. The locking mechanism typically comprises a rack of teeth on the outer disc and several pawls each with a plurality of teeth. The pawls are moveable in a radial direction between a locked position and an unlocked position. With the pawls in the locked position, the teeth on the pawls are interlocked with the rack of teeth on the outer disc, thus locking the angular position of the seat back relative to the seat cushion. When the pawls are moved from the locked position to the unlocked position, the teeth on the pawls are no longer interlocked with the rack of teeth on the outer disc, thus allowing adjustment of the seat back relative to the seat cushion.

SUMMARY OF THE INVENTION

This invention relates to a recliner assembly having a locking mechanism that is operable in an axial direction so as to minimize the package size of the recliner assembly. The recliner assembly comprises a cylindrical shaft extending longitudinally between opposite first and second ends. The shaft has an outer surface and a plurality of shaft teeth extending radially outwardly from the outer surface between the first and second ends. The recliner further includes a seat back disc rotatably journaled to the shaft between the shaft teeth and the first end and adapted to be fixedly secured to the seat back. The seat back disc has opposite first and second surfaces substantially parallel to the first and second ends of the shaft, respectively, and a plurality of first locking teeth extending axially from one of the first and second surfaces. A seat cushion disc is fixedly secured to the shaft between the seat back disc and the first end and is adapted to be fixedly secured to the seat cushion. A locking disc having a center bore defined by a plurality of inner teeth is axially coupled to the shaft by mating engagement of the inner teeth with the shaft teeth. The locking disc has opposite first and second surfaces substantially parallel to the ends of the shaft, respectively, and a plurality of second locking teeth extending axially from one of the first and second surfaces. A cam ring is slidably coupled to the shaft and fixedly secured to the locking disc. The cam ring has at least one ramped cam surface extending axially toward the second end of the shaft. The recliner also includes a cam disc rotatably journaled to the shaft between the cam ring and the second end. The cam disc has at least one cam block extending axially toward the cam ring for engagement therewith whereby the cam block engages the cam surface and forces the cam ring and the locking disc to move axially along the shaft to lockingly engage the first locking teeth with the second locking teeth in response to rotation of the cam disc about the shaft for selectively locking the seat back in one of the reclined positions.

BRIEF DESCRIPTION OF THE DRAWINGS

Other advantages of the present invention will be readily appreciated as the same becomes better understood by reference to the following detailed description when considered in connection with the accompanying drawings wherein:

FIG. 3 is a cross-sectional view of the recliner assembly of the subject invention shown in a locked position;

FIG. 4 is a cross-sectional view of the recliner assembly of the subject invention shown in an unlocked position;

FIG. 5 is a perspective view of a cam disc of the recliner assembly.

DETAILED DESCRIPTION OF THE PREFERRED EMBODIMENT

Figure 1:
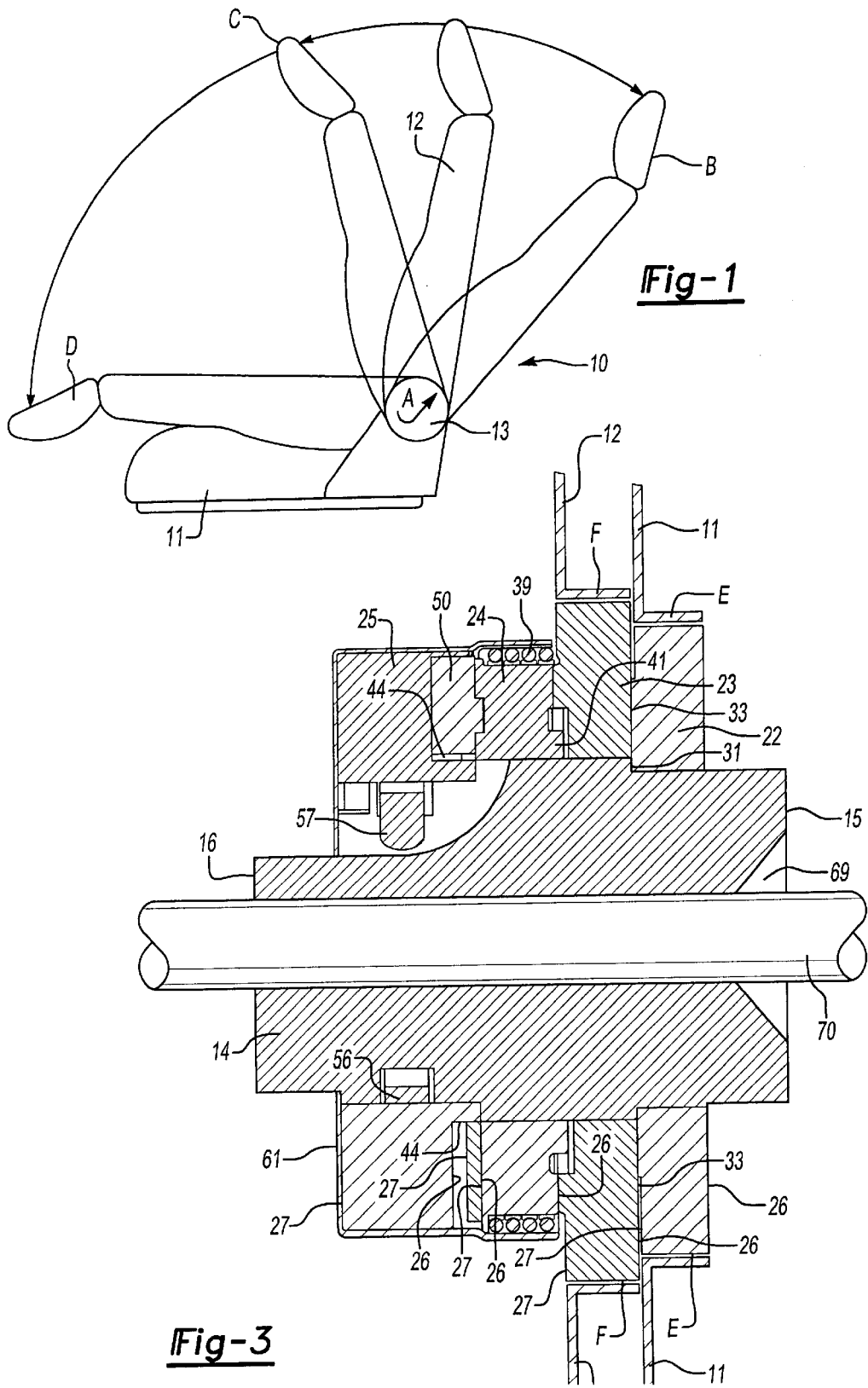
FIG. 1 is a schematic side view of an automotive seat assembly incorporating the subject invention.

A seat assembly for use in an automotive vehicle is generally shown at 10 in FIG. 1. The seat assembly 10 includes a seat cushion 11 and a seat back 12. Each of the seat cushion 11 and the seat back 12 includes a rigid frame structure that supports a contoured, foam pad encased by a trim cover. A recliner assembly 13 presenting a pivot axis A operatively interconnects the seat cushion 11 and seat back 12 for pivotal movement of the seat back 12 about a pivot axis A between one of a plurality of reclined seating positions, shown between B and C in FIG. 1 and a forwardly folded flat position, shown at D in FIG. 1. Further, the seat back 12 is continuously biased to the forwardly folded flat position D by a coil spring (not shown) attached between the seat back and the seat cushion 11.

Figure 2:
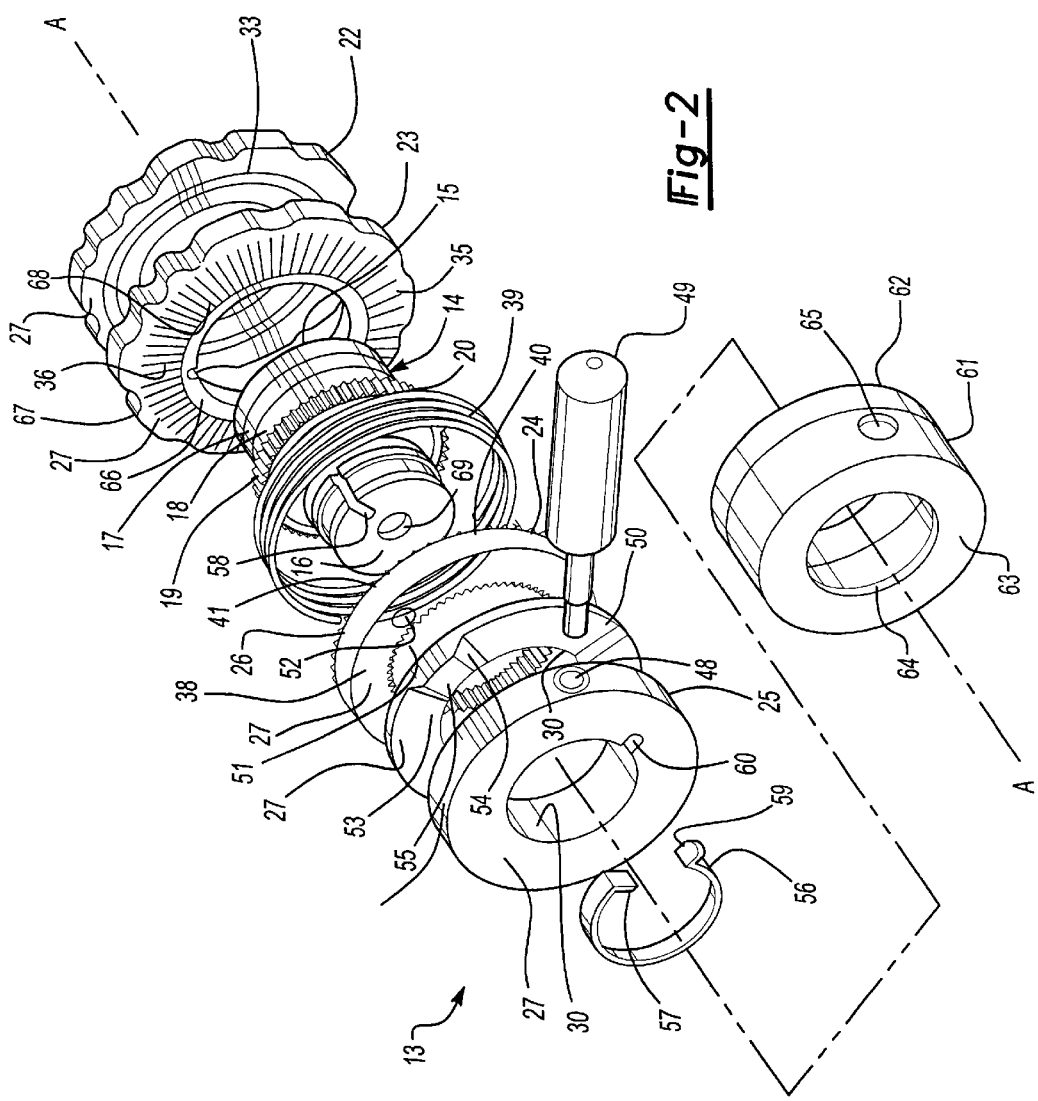
FIG. 2 is a perspective exploded view of a recliner assembly according to the subject invention.

Referring to FIG. 2, the recliner assembly 13 comprises a shaft 14 having a first end 15 and a second end 16. The shaft 14 presents defining a longitudinal axis, which defines the pivot axis A. The shaft 14 includes a mounting surface 17 adjacent to the first end 15 of the shaft 14 for receiving a fixed flange or seat cushion disc 22. The shaft 14 further includes a first bearing surface 18 adjacent to the mounting surface 17 for receiving a mobile flange or seat back disc 23. The shaft 14 further includes a second bearing surface 19 adjacent to the first bearing surface 18 for receiving a locking member or locking disc 24. The second bearing surface 19 has a plurality of shaft teeth 20 which extend radially therefrom. The shaft 14 further includes a third bearing surface 21 adjacent to the second bearing surface 19 for receiving a cam member or cam disc 25. Described further below, a cam ring 50 is positioned between the cam disc 25 and the locking disc 24. The seat cushion disc 22, seat back disc 23, the locking disc 24, the cam ring 50, and the cam disc 25 each have a first surface 26 substantially parallel to the first end 15 of shaft 3, a second surface 27 substantially parallel to the second end 16 of shaft 3; an outer peripheral surface 28 interconnecting the first surface 26 and the second surface 27; and a center bore 29 defined by an inner surface 30 extending between the respective first surface 26 and the second surface 27 for receiving the shaft 14 therethrough.

The seat cushion disc 22 is fixedly attached to the mounting surface 17 of the shaft 14 by any suitable methods such as by a press fit or keyed relationship between the center bore 29 of the seat cushion disc 22 and the mounting surface 17 of the shaft 14. The seat cushion disc 22 includes a lip 33 extending from the second surface 27 of the seat cushion disc 22. Further, the seat cushion disc 22 is fixedly attached to the seat cushion 11 by any suitable means, such as by being bolted or welded to a portion of the frame of the seat cushion 11, as shown at E in FIGS. 3 and 4. Thus, the shaft 14 is fixed relative to the seat cushion 11.

The seat back disc 23 is rotatably mounted to the shaft 14 on the first bearing surface 18 and a portion of the seat back disc 23 is spaced axially relative to the seat cushion disc 22 by contact between the first surface 26 of the seat back disc 23 and a lip 33 on the second surface 27 of the seat cushion disc 22, as best shown in FIG. 3. The seat back disc 23 is fixedly attached by any suitable means to the seat back 12, such as by being bolted or welded to a portion of the frame of the seat back 12 as shown at B in FIGS. 3 and 4. The seat back disc 23 includes a plurality of first locking teeth 35 projecting from its second surface 27. The second surface 27 of the seat back 23 further includes an annular surface 66. The annular surface 6 includes a stepped annular recess 36 having first and second ends 67, 68 which define the range of reclined seating positions, shown between B and C in FIG. 1. As explained in detail below, the first end 67 defines a default, forward-most reclined seating position C for the seat back 12.

The locking disc 24 is assembled to the shaft 14 on the second bearing surface 19. The locking disc 24 includes a plurality of inner teeth 38 extending radially from its inner surface 30. The locking disc 24 is rotatably constrained by complementary engagement of the inner teeth 38 of the locking disc 24 with the shaft teeth 20. By this arrangement, the locking disc 24 can move axially along the shaft 14 between a locked position towards the seat back disc 23, as shown in FIG. 3, and an unlocked position away from the seat back disc 23, as shown in FIG. 4. The locking disc 24 is biased to the unlocked position by use of a spring 39 positioned between the locking disc 24 and the seat back disc 23. The locking disc 24 includes a plurality of second locking teeth 40 extending from its first surface 26 for locking engagement with the first locking teeth 35 of the seat back disc 23. The locking disc 24 further includes a tab 41 for sliding engagement with the annular recess 36 and the annular surface 66 of the seat back disc 23. A hole 52 is formed in the second surface of the locking disc 24, the purpose of which is described below.

The cam disc 25 is rotatably assembled and axially constrained to the second end 16 of the shaft 14 on the third bearing surface 21 for movement between a released position and an unreleased position. As best shown in FIG. 5, a cylindrical portion 43 extends from the first surface 26 of the cam disc 25 defining an outer bearing surface 44 that is parallel to the inner surface 30 of the cam disc 25 and interconnects a series of cam blocks 45 extending from the first surface 26. Each of the cam blocks 45 are defined by a leading edge 46, the outer bearing surface 44, a trailing edge 47, and the outer peripheral surface 28. The cam disc 25 further includes a hole 48 in the outer peripheral surface 28 for fixedly receiving a release handle 49.

The cam ring 50 is located between the cam disc 25 and locking disc 24. The cam ring 50 is rotatably constrained by a pin 51 extending from the first surface 26 of the cam ring 50 into a hole 52 in the second surface 27 of the locking disc 24. Referring back to FIG. 1, the cam ring 50 further includes a series of cam surfaces 53 extending from its second surface 27, corresponding in number and position to the cam blocks 45 on the cam disc 25. Each cam surface 53 includes an inclined ramp surface 54 for sliding engagement with the leading edges 46 of the cam disc 25. Additionally, each cam surface 53 includes a locking surface 55 which rest against the raised surface 45 of the cam disc 25 when the cam disc 25 is in the unreleased position. The cam disc 25 is rotatably engaged with the cam ring 50 by insertion of the cylindrical portion 43 through the center bore 29 of the cam ring 50. As explained in detail below, rotation of the cam disc 25 between the unreleased position and the released position results in axial motion of the cam ring 50 and the locking disc 24 between the locked position against the seat back disc 23, as shown in FIG. 3, and the unlocked position away from the seat back disc 23, as shown in FIG. 4.

A return spring 56, having a first end 57 and a second end 59, is mounted to the second end 16 of the shaft 14 by insertion of the first end 57 into a slot 58 formed in the shaft 14. The return spring 56 is tensioned by insertion of the second end 59 into a slot 60 on the cam disc 25, thereby biasing the cam disc 25 to the unreleased position.

As best shown in FIGS. 3 and 4, a cup shaped housing nestingly encompasses the cam disc 25, the cam ring 50, the locking disc 24, and the spring 39. The housing 61 is fixedly attached to the cam disc 25 by any conventional means, such as by bolting or welding. By this arrangement, the housing 61 rotates with the cam disc 25. The housing 61 further includes a hole 65 which aligns with the hole 48 in the peripheral surface 28 of cam disc 25, thus allowing assembly of the release handle 49 through the housing 61 and into the cam disc 25.

In operation, the cam disc 25 of the recliner assembly 13 is biased by the return spring 56 in the unreleased position, where in the unreleased position locking surfaces 55 of the cam ring 50, rest against the cam blocks 45 of the cam disc 25 so as to hold the cam ring 50 toward the seat back disc 23. In this state, the second locking teeth 40 of the locking disc 24 are held in locking engagement with the first locking teeth 35 of the seat back disc 23. Further, the spring 39 is held in compression between the locking disc 24 and the cam ring 50, and the cam ring 50 and the cam disc 25. With the second locking teeth 40 of the locking disc 24 in locking engagement with the first locking teeth 35 of the seat back disc 23, the angular position of the seat back 12 relative to the seat cushion 11 is maintained.

To incrementally adjust the angle of the seat back 12 relative to the seat cushion 11, the cam disc 25 is rotated to the released position. Specifically, the cam disc 25 is rotated by applying a force to the release handle 49, against the bias of the return spring 56, such that the cam blocks 45 of the cam disc 25 slide along the locking surfaces 55 of the cam ring 50. Release of the recliner assembly 13 occurs when the cam blocks 45 and the locking surfaces 55 are no longer in contact and the leading edges 46 of the cam disc 25 slide down the inclined ramp surfaces 54 of the cam ring 50 causing the cam ring 50 to move towards the cam disc 25 and away from the seat back disc 23. Following the motion of the cam ring 50, the locking disc 24 moves to the unlocked position away from the seat back disc 23. In this state, the second locking teeth 40 of the locking disc 24 are no longer in locking engagement with the first locking teeth 35 of the seat back disc 23. Once the second locking teeth 40 of the locking disc 24 has moved out of locking engagement with the first locking teeth 35 of the seat back disc 23, the angle of the seat back 12 may be adjusted relative to the seat cushion 11. As the angle of the seat back 12 is adjusted through the range of reclined seating positions between B and C, the tab 41 of the locking disc 24 slides within the annular recess 36.

Once the angle of the seat back 12 has been adjusted to a desired seating position, the cam disc 25 is allowed to return to the unreleased position. Specifically, the force applied to the release handle 49 is removed. The return spring 56 urges the cam disc 25 into rotation such that the leading edges 46 of the cam disc 25 slide up the inclined ramp surfaces 54 of the cam ring 50 forcing the cam ring 50 and the locking disc 24 to move towards the seat back disc 12. As rotation of the cam disc 25 continues, the cam blocks 45 of the cam disc 25 eventually make contact with the locking surfaces 55 of the cam ring 50, holding the locking disc 24 in the locked position against the seat back disc. With the locking disc 24 returned to the locked position, the second locking teeth 40 of the locking disc 24 re-engage the first locking teeth 35 of the seat back disc 23 and the angular position of the seat back 12 relative to the seat cushion 11 is maintained.

To allow the seat back 12 to move to the biased, forwardly folded flat position D, the cam disc 25 of the recliner assembly 13 is rotated to the released position by applying force to the release handle 49. Once the locking disc 24 is disengaged from the seat back disc 23, the seat back 12 is free to pivot towards the biased, forwardly folded flat position D. As the seat back 12 pivots, the tab 41 of the locking disc eventually slides beyond the first end 67 of the annular recess 36. Once the tab 41 has moved beyond the first end 67 of the annular recess 36, the force applied to the released handle 49 to hold the cam disc 25 in the released position may then be removed, allowing the tab 41 to rest against and slide along the annular surface 36. While the tab 41 slides along the annular surface 36, the locking disc is held in the unlocked position away from the seat back disc 23. Further, the cam disc 25 is held in the unreleased position against the force of the return spring 56 as the leading edge 46 of the cam disc 25 rests against the inclined ramped surface 54 of the cam ring 50. Thus, once the tab 41 has moved beyond the first end 67 of the annular recess 36 and onto the annular surface 36, it is no longer necessary to hold the cam disc 25 in the unreleased position with force applied to the release handle 49, and the seat back 12 can continue to pivot towards the biased, forwardly folded flat position D.

The seat back 12 may be returned from the forwardly folded flat position D to the default recline seating position by applying a rearward force to the seat back 12 against the forward bias of the coil spring (not shown). As the seat back 12 is moved rearwardly from the forwardly folded flat position D, the tab 41 of the locking disc 24 slides along the annular surface 36. Once the tab 41 moves beyond the annular surface 66, the return spring 56 is allowed to force rotation of the cam disc 25 to the unreleased position. Rotation of the cam disc 25 to unreleased position forces the cam ring 50, moves to the locked position against the seat back disc 23. As the locking disc 24 moves to the locked position, the tab 41 of the locking disc 24 falls into the first end 67 of the annular recess 36 of the seat back disc 23, thereby locking the seat back disc 12 in the default forwardmost reclined seating position C. In this state, the seat back 12 may again be adjusted between a plurality of reclined seating positions or the forwardly folded flat position D.

It is should be appreciated that the seat assembly 10 may utilize more than one recliner assembly 13 for operatively interconnecting the seat cushion 11 and the seat back 12. When more than one recliner assembly 13 is used, each shaft 14 of each recliner assembly 13 preferably includes an axial bore 69 extending through and between the first and second ends 15, 16. Under this configuration, a torque rod 70, as shown in FIG. 3, is inserted through and rotatably supported within each of the axial bores 69 for generally synchronous release of each of the recliner assemblies 13 from its locked state. Alternatively, a cable may be used to generally synchronize the rotary motions of the cam discs 25 of each recliner assembly 13.

The invention has been described in an illustrative manner, and it is to be understood that the terminology, which has been used, is intended to be in the nature of words of description rather than of limitation.

Many modification and variations of the present invention are possible in light of the above teachings. It is, therefore, to be understood that within the scope of the appended claims, the invention may be practiced other than as specifically described.

What is claimed is:

1. A recliner assembly for locking a seat back in one of a plurality of reclined positions relative to a seat cushion on a vehicle seat, said recliner assembly comprising:

a shaft extending longitudinally between first and second ends to define a pivot axis, said shaft having a plurality of radially extending shaft teeth;

a fixed flange fixedly secured to said shaft;

a mobile flange rotatably journaled to said shaft having a toothing extending axially outwardly therefrom;

a locking member slidably assembled to said shaft adjacent said mobile flange and including a plurality of radially extending inner teeth meshed with said shaft teeth for providing sliding axial movement of said locking member along said shaft relative to said mobile flange, said locking member including a toothing extending axially outwardly therefrom for selectively and lockingly engaging said toothing of said mobile flange;

a cam member rotatably assembled to said shaft adjacent and operatively coupled to said locking member for axially displacing said locking member along said shaft relative to said mobile flange in response to rotation of said cam member, whereby said toothing of said locking member is selectively moveable between locking engagement with said toothing of said mobile flange to prevent rotation of said mobile flange relative to said shaft and out of locking engagement with said toothing of said mobile flange to allow rotation of said mobile flange relative to said shaft; and a cam ring rotatably constrained against said locking member and compressed between said cam member and said locking member, said cam ring including a raised portion extending axially towards said cam member for cooperating with a raised portion extending axially from said cam member to selectively control movement of said locking member axially along said shaft into said locking engagement with said mobile flange in response to rotation of said cam member.

2. A recliner assembly as set forth in claim 1 wherein said cam ring includes a locking surface extending axially towards said cam member and said cam member includes a complementary cam block for engaging said locking sufaceof said locking member, whereby said toothing of said locking member is held in locking engagement with said toothing of said mobile flange to prevent rotation of said mobile flange relative to said shaft defining a locked state.

3. A recliner assembly as set forth in claim 2 wherein said cam ring member includes a ramped surface adjacent said locking surface for engaging said cam block of said cam member during rotation of said cam member, whereby said locking member is displaced axially relative to said mobile flange by said rotation of said cam member.

4. A recliner assembly as set forth in claim 3 including a first biasing member for axially biasing said locking member away from said mobile flange.

5. A recliner assembly as set forth in claim 4 including a second biasing member extending between said cam member and said shaft for rotatably biasing said cam member such that said locking member is held in said locked state.

6. A recliner assembly as set forth in claim 5 wherein said second biasing member is adapted to overcome axial bias of said first biasing member.

7. A recliner assembly as set forth in claim 6 wherein said first biasing member spans axially between said locking member and said mobile flange and comprises spaced apart helical coils extending therebetween.

8. A recliner assembly as set forth in claim 7 having an arm extending radially outwardly from said cam member for rotatably actuating said cam member.

9. A recliner assembly as set forth in claim 8 wherein said fixed flange is fixedly secured to the seat cushion and said mobile flange is fixedly secured to the seat back.

10. A recliner assembly as set forth in claim 1 wherein said locking member includes a keyed aperture for receiving a complementary portion of said shaft therethrough, whereby said locking member is rotatably constrained and axially moveable relative to said mobile flange.

11. A recliner assembly as set forth in claim 10 wherein said toothing of said mobile flange comprises an annular rack of axially extending teeth.

12. A recliner assembly as set forth in claim 11 wherein said toothing of said locking member comprises at least one tooth adapted for lockingly engaging said annular rack of axially extending teeth of said mobile flange.

* * * * *

UNITED STATES PATENT AND TRADEMARK OFFICE
CERTIFICATE OF CORRECTION

| | | |
|---|---|---|
| PATENT NO. | : 6,758,524 B2 | Page 1 of 1 |
| APPLICATION NO. | : 10/332715 | |
| DATED | : July 6, 2004 | |
| INVENTOR(S) | : Ng et al. | |

It is certified that error appears in the above-identified patent and that said Letters Patent is hereby corrected as shown below:

On the cover page, item (75), please add the following inventor:

Pius Ng

Signed and Sealed this
Tenth Day of May, 2011

David J. Kappos
*Director of the United States Patent and Trademark Office*